US009706307B2

(12) United States Patent
Yoon et al.

(10) Patent No.: US 9,706,307 B2
(45) Date of Patent: Jul. 11, 2017

(54) SOUND SYSTEM USING WIRELESS POWER TRANSMISSION

(75) Inventors: Chang Wook Yoon, Seoul (KR); Sang Wook Kwon, Seongnam-si (KR); Nam Yun Kim, Seoul (KR); Eun Seok Park, Yongin-si (KR); Ki Young Kim, Yongin-si (KR); Dong Zo Kim, Yongin-si (KR); Yun Kwon Park, Dongducheo-si (KR); Young Ho Ryu, Yongin-si (KR); Jin Sung Choi, Gimpo-si (KR); Young Tack Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 13/602,524

(22) Filed: Sep. 4, 2012

(65) Prior Publication Data

US 2013/0101133 A1 Apr. 25, 2013

(30) Foreign Application Priority Data

Oct. 24, 2011 (KR) ........................ 10-2011-0108588

(51) Int. Cl.
*H04B 3/00* (2006.01)
*H04R 5/04* (2006.01)
(Continued)

(52) U.S. Cl.
CPC ................. *H04R 5/04* (2013.01); *H04R 3/12* (2013.01); *H04R 2205/024* (2013.01);
(Continued)

(58) Field of Classification Search
CPC .. H02J 17/00; H02J 5/005; H02J 7/025; H02J 50/12; H02J 7/0004; H02J 50/40;
(Continued)

(56) References Cited

U.S. PATENT DOCUMENTS

| | | | | |
|---|---|---|---|---|
| 8,638,957 B2 * | 1/2014 | Sim et al. | ..................... | 381/182 |
| 2009/0110216 A1 | 4/2009 | Tschirpke | | |

(Continued)

FOREIGN PATENT DOCUMENTS

| | | |
|---|---|---|
| JP | 2006-005426 A | 1/2006 |
| JP | 2009-065239 A | 3/2009 |

(Continued)

OTHER PUBLICATIONS

Korean Office Action issued on Apr. 14, 2017, in counterpart Korean Application No. 10-2011-0108588 (6 pages in English, 5 pages in Korean).

*Primary Examiner* — Paul S Kim
*Assistant Examiner* — Norman Yu
(74) *Attorney, Agent, or Firm* — NSIP Law

(57) ABSTRACT

A sound system using wireless power transmission is provided. A power and data transmission apparatus in the sound system, includes a data transmitting unit configured to wirelessly transmit, to a sound output device, sound data. The apparatus further includes a power transmitting unit configured to wirelessly transmit, to the sound output device, power. The apparatus further includes a controller configured to control the data transmitting unit and the power transmitting unit based on a distance between the apparatus and the sound output device.

21 Claims, 14 Drawing Sheets

(51) Int. Cl.
*H04R 3/12* (2006.01)
*H04S 3/00* (2006.01)

(52) U.S. Cl.
CPC .. *H04R 2205/026* (2013.01); *H04R 2227/005* (2013.01); *H04R 2420/07* (2013.01); *H04S 3/00* (2013.01)

(58) Field of Classification Search
CPC .. H04B 5/0037; H04B 5/0025; H04B 5/0075; H04R 2420/07; H04R 3/00; H04R 5/04; H04R 3/12; H04R 1/1041; H04R 1/403; H04R 2227/005; H04R 2420/03; B60L 11/182; H04W 4/008; H04W 76/02; H04S 3/00; H04S 2400/01; H04M 1/6066; H04M 1/7253
USPC ......... 381/300, 79, 17, 80, 119, 2, 307, 332, 381/384, 58, 77; 307/104; 320/108; 455/41.3, 41.1, 3.05
See application file for complete search history.

(56) References Cited

U.S. PATENT DOCUMENTS

| | | | | |
|---|---|---|---|---|
| 2010/0127660 | A1* | 5/2010 | Cook et al. | 320/108 |
| 2010/0259108 | A1 | 10/2010 | Giler et al. | |
| 2012/0001497 | A1* | 1/2012 | Sada et al. | 307/104 |
| 2012/0063505 | A1* | 3/2012 | Okamura et al. | 375/238 |
| 2012/0235502 | A1* | 9/2012 | Kesler et al. | 307/104 |

FOREIGN PATENT DOCUMENTS

| | | | |
|---|---|---|---|
| JP | 2009-153056 | A | 7/2009 |
| JP | 2009-224822 | A | 10/2009 |
| JP | 2011-155427 | A | 8/2011 |
| KR | 10-2009-0036953 | A | 4/2009 |
| KR | 10-2011-0004321 | A | 1/2011 |
| SG | WO2011/010968 | * | 1/2011 |

* cited by examiner

SOUND SYSTEM USING WIRELESS POWER TRANSMISSION

CROSS-REFERENCE TO RELATED APPLICATION(S)

This application claims the benefit under 35 U.S.C. §119(a) of Korean Patent Application No. 10-2011-0108588, filed on Oct. 24, 2011, in the Korean Intellectual Property Office, the entire disclosure of which is incorporated herein by reference for all purposes.

BACKGROUND

1. Field

The following description relates to a sound system using wireless power transmission.

2. Description of Related Art

Research on wireless power transmission has been conducted to overcome the increase in inconvenience of wired power supplies, and the limited capacity of conventional batteries, due to the rapid increase in various electronic devices including mobile devices. One wireless power transmission technology uses resonance characteristics of radio frequency (RF) devices. For example, a wireless power transmission system using resonance characteristics includes a source device configured to supply power, and a target device configured to receive the supplied power. To efficiently transmit the power from the source device to the target device, the source device and the target device exchange information on a state of the source device, and information on a state of the target device, with each other.

In a sound system, speakers generating sound may need to be positioned in various directions around a listener in order to obtain a surround sound effect. In addition, a greater number of speakers may be required for stereophonic sound effects.

Speakers may receive power and sound through wired connections. If a number of the speakers and a distance between the speakers increases, there may be a limit to the transmission of the power and the sound through the wired connections.

Accordingly, there is a demand for wireless transmission of power and sound.

SUMMARY

In one general aspect, there is provided a power and data transmission apparatus in a sound system using wireless power transmission, the apparatus including a data transmitting unit configured to wirelessly transmit, to a sound output device, sound data. The apparatus further includes a power transmitting unit configured to wirelessly transmit, to the sound output device, power. The apparatus further includes a controller configured to control the data transmitting unit and the power transmitting unit based on a distance between the apparatus and the sound output device.

The sound data may be stored in a storage space, or may be received from a broadcasting station in real-time, or any combination thereof.

The apparatus may further include a source resonator. The sound output device may include a target resonator, the source resonator and the target resonator being configured to perform magnetic coupling with each other to wirelessly transmit and receive, respectively, the sound data and the power. The controller may be further configured to control the data transmitting unit and the power transmitting unit based on a distance between the source resonator and the target resonator.

The controller may be further configured to control the data transmitting unit to wirelessly transmit, to the sound output device, the sound data via in-band communication if the distance between the source resonator and the target resonator is less than or equal to a predetermined value. The controller may be further configured to wirelessly transmit, to the sound output device, the sound data via out-band communication if the distance between the source resonator and the target resonator is greater than the predetermined value.

The controller may be further configured to control the power transmitting unit to transmit the power to a relay device positioned within a distance less than or equal to a predetermined value if the distance between the source resonator and the target resonator is greater than the predetermined value.

The relay device may be configured to receive, from the power transmitting unit, the power. The relay device may be further configured to transfer, to the sound output device, the power.

The apparatus may further include a sensing unit configured to measure the distance between the source resonator and the target resonator.

The controller may be further configured to control the data transmitting unit and the power transmitting unit to wirelessly transmit, to the sound output device, the sound data and the power, respectively and simultaneously, if the distance between the source resonator and the target resonator is less than or equal to a predetermined value. The controller may be further configured to control the data transmitting unit to wirelessly transmit, to the sound output device, the sound data if the distance between the source resonator and the target resonator is greater than the predetermined value.

The sound output device may include speakers.

The sound output device may include a hexahedral speaker. Each face of the hexahedral speaker may include a resonator configured to perform magnetic coupling to wirelessly receive the sound data and the power.

The sound output device may include a power storage device configured to maintain a constant input impedance of the sound output device.

In another general aspect, there is provided a power and data reception apparatus in a sound system using wireless power transmission, the apparatus including a data receiving unit configured to wirelessly receive, from a power and data transmission apparatus, sound data. The apparatus further includes a power receiving unit configured to wirelessly receive, from the power and data transmission apparatus, power. The apparatus further includes a sound output unit configured to output the sound data.

The apparatus may further include a target resonator. The power and data transmission apparatus may include a source resonator, the source resonator and the target resonator being configured to perform magnetic coupling with each other to wirelessly transmit and receive, respectively, the sound data and the power.

The apparatus may further include a relay unit configured to transfer, to a sound output device, the power. The data receiving unit may be further configured to receive data about the sound output device. The relay unit may be further configured to transfer, to the sound output device, the power based on the data about the sound output device.

The apparatus may further include a controller configured to determine an output level of the sound output unit. The sound output unit may be further configured to amplify the sound data based on the output level, and output the amplified sound data.

The apparatus may further include a power storage unit disposed between the power receiving unit and the sound output unit, and configured to store a predetermined amount of power, and transfer, to the sound output unit, the stored power based on the output level.

In still another general aspect, there is provided a sound system using wireless power transmission, the sound system including a data transmitting unit configured to wirelessly transmit sound data. The sound system further includes a power transmitting unit configured to wirelessly transmit power. The sound system further includes speakers configured to wirelessly receive the sound data and the power, and output the sound data.

The sound data may include multichannel sound data generated based on a number of the speakers.

The sound system may further include a source resonator. The sound system may further include a controller configured to determine the multichannel sound data matching each of the speakers including respective target resonators based on a distance between the source resonator and each of the respective target resonators, the source resonator and the target resonators being configured to perform magnetic coupling with each other to wirelessly transmit and receive, respectively, the sound data and the power.

The controller may be further configured to classify the speakers into nearby speakers and remote speakers based on the distance between the source resonator and each of the respective target resonators.

The sound system may further include a charging wall disposed at a predetermined distance from the remote speakers, and configured to transmit, to the remote speakers, power.

At least one of the speakers may be further configured to operate as a relay speaker configured to wirelessly transfer, to another speaker, at least a portion of the power.

The sound system may further include a controller configured to determine an output level of the speakers. Each of the speakers may include an amplifier configured to amplify the sound data, and a power storage unit configured to store a predetermined amount of power, and transfer, to the amplifier, the stored power based on the output level.

Other features and aspects will be apparent from the following detailed description, the drawings, and the claims.

Figure 1:
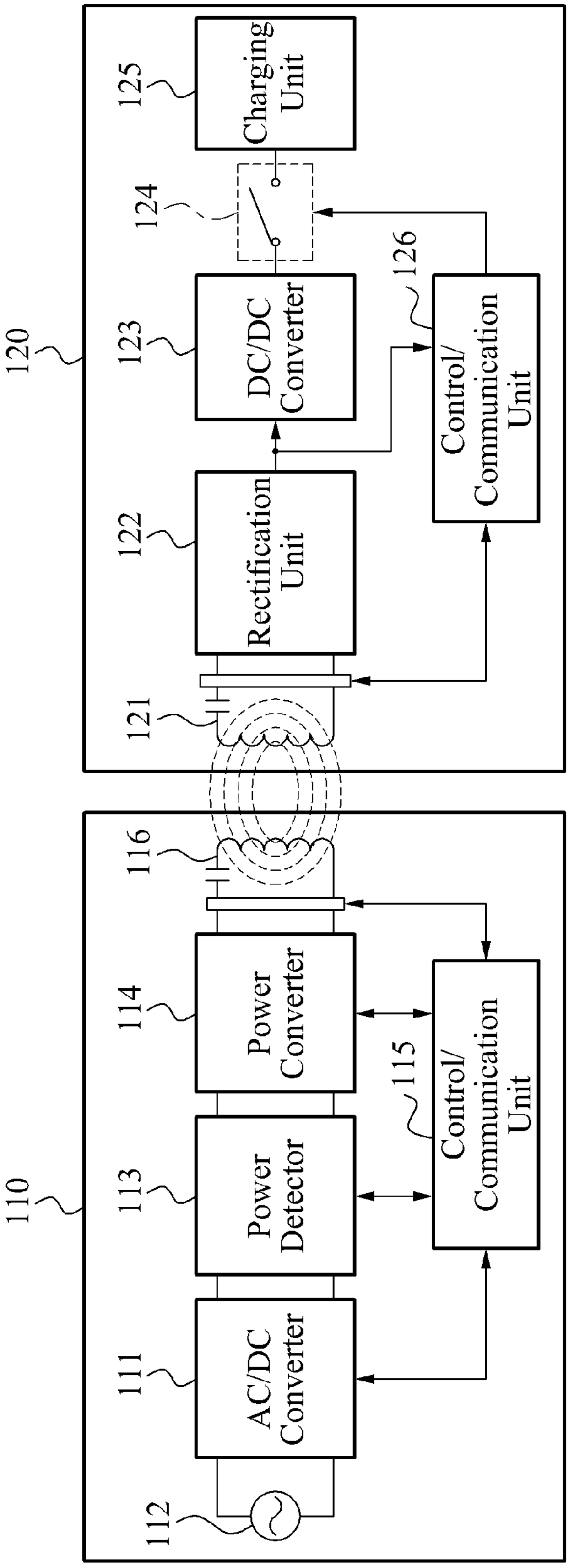
FIG. 1 is a diagram illustrating an example of a wireless power transmission and charging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

A scheme of performing communication between a source device and a target device may include an in-band communication scheme and an out-band communication scheme. The in-band communication scheme refers to communication performed between the source device and the target device in the same frequency band as used for power transmission. The out-band communication scheme refers to communication performed between the source device and the target device in a separate frequency band than that used for power transmission.

If source devices are densely-positioned, communication between the source device and the target device may be difficult due to communication errors and peripheral signal interference. To determine an optimal channel without interference, a communication apparatus in a wireless power transmission system may determine information about a channel currently unused by another source device in a method of assigning, to a source device, a channel to be used to perform communication.

FIG. 1 is a diagram illustrating an example of a wireless power transmission and charging system. Referring to FIG.

1, the wireless power transmission and charging system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes an alternating current-to-direct current (AC/DC) converter 111, a power detector 113, a power converter 114, a control and communication (control/communication) unit 115, and a source resonator 116.

The target device 120 includes a target resonator 121, a rectification unit 122, a DC-to-DC (DC/DC) converter 123, a switch unit 124, a charging unit 125, and a control/communication unit 126.

The AC/DC converter 111 generates a DC voltage by rectifying an AC voltage having a frequency of tens of hertz (Hz) output from a power supply 112. The AC/DC converter 111 may output a DC voltage having a predetermined level, or may output a DC voltage having an adjustable level by the control/communication unit 115.

The power detector 113 detects an output current and an output voltage of the AC/DC converter 111, and provides, to the control/communication unit 115, information on the detected current and the detected voltage. Additionally, the power detector 113 detects an input current and an input voltage of the power converter 114.

The power converter 114 generates a power by converting the DC voltage output from the AC/DC converter 111 to an AC voltage using a switching pulse signal having a frequency of a few kilohertz (kHz) to tens of megahertz (MHz). In other words, the power converter 114 converts a DC voltage supplied to a power amplifier to an AC voltage using a reference resonance frequency $F_{Ref}$, and generates a communication power to be used for communication, or a charging power to be used for charging that may be used in a plurality of target devices. The communication power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term “charging” may refer to supplying power to an element or a unit that charges a battery or other rechargeable device with power. Also, the term “charging” may refer supplying power to an element or a unit that consumes power. For example, the term “charging power” may refer to power consumed by a target device while operating, or power used to charge a battery of the target device. The unit or the element may include, for example, a battery, a display device, a sound output circuit, a main processor, and various types of sensors.

In this description, the term “reference resonance frequency” refers to a resonance frequency that is nominally used by the source device 110, and the term “tracking frequency” refers to a resonance frequency used by the source device 110 that has been adjusted based on a predetermined scheme.

The control/communication unit 115 may detect a reflected wave of the communication power or a reflected wave of the charging power, and may detect mismatching between the target resonator 121 and the source resonator 116 based on the detected reflected wave. The control/communication unit 115 may detect the mismatching by detecting an envelope of the reflected wave, or by detecting an amount of a power of the reflected wave. The control/communication unit 115 may calculate a voltage standing wave ratio (VSWR) based on a voltage level of the reflected wave and a level of an output voltage of the source resonator 116 or the power converter 114. When the VSWR is greater than a predetermined value, the control/communication unit 115 detects the mismatching. In this example, the control/communication unit 115 calculates a power transmission efficiency of each of N predetermined tracking frequencies, determines a tracking frequency $F_{Best}$ having the best power transmission efficiency among the N predetermined tracking frequencies, and changes the reference resonance frequency $F_{Ref}$ to the tracking frequency $F_{Best}$.

Also, the control/communication unit 115 may control a frequency of the switching pulse signal used by the power converter 114. By controlling the switching pulse signal used by the power converter 114, the control/communication unit 115 may generate a modulation signal to be transmitted to the target device 120. In other words, the control/communication unit 115 may transmit various messages to the target device 120 via in-band communication. Additionally, the control/communication unit 115 may detect a reflected wave, and may demodulate a signal received from the target device 120 through an envelope of the reflected wave.

The control/communication unit 115 may generate a modulation signal for in-band communication using various schemes. To generate a modulation signal, the control/communication unit 115 may turn on or off the switching pulse signal used by the power converter 114, or may perform delta-sigma modulation. Additionally, the control/communication unit 115 may generate a pulse-width modulation (PWM) signal having a predetermined envelope.

The control/communication unit 115 may perform out-of-band communication using a communication channel. The control/communication unit 115 may include a communication module, such as a ZigBee module, a Bluetooth module, or any other communication module, that the control/communication unit 115 may use to perform the out-of-band communication. The control/communication unit 115 may transmit or receive data to or from the target device 120 via the out-of-band communication.

The source resonator 116 transfers electromagnetic energy, such as the communication power or the charging power, to the target resonator 121 via a magnetic coupling with the target resonator 121.

The target resonator 121 receives the electromagnetic energy, such as the communication power or the charging power, from the source resonator 116 via a magnetic coupling with the source resonator 116. Additionally, the target resonator 121 receives various messages from the source device 110 via the in-band communication.

The rectification unit 122 generates a DC voltage by rectifying an AC voltage received by the target resonator 121.

The DC/DC converter 123 adjusts a level of the DC voltage output from the rectification unit 122 based on a voltage rating of the charging unit 125. For example, the DC/DC converter 123 may adjust the level of the DC voltage output from the rectification unit 122 to a level in a range from 3 volts (V) to 10 V.

The switch unit 124 is turned on or off by the control/communication unit 126. When the switch unit 124 is turned off, the control/communication unit 115 of the source device 110 may detect a reflected wave. In other words, when the switch unit 124 is turned off, the magnetic coupling between the source resonator 116 and the target resonator 121 is interrupted.

The charging unit 125 may include a battery. The charging unit 125 may charge the battery using the DC voltage output from the DC/DC converter 123.

The control/communication unit 126 may perform in-band communication for transmitting or receiving data using a resonance frequency by demodulating a received signal obtained by detecting a signal between the target resonator 121 and the rectification unit 122, or by detecting an output signal of the rectification unit 122. In other words, the control/communication unit 126 may demodulate a message received via the in-band communication.

Additionally, the control/communication unit 126 may adjust an impedance of the target resonator 121 to modulate a signal to be transmitted to the source device 110. Specifically, the control/communication unit 126 may modulate the signal to be transmitted to the source device 110 by turning the switch unit 124 on and off. For example, the control/communication unit 126 may increase the impedance of the target resonator by turning the switch unit 124 off so that a reflected wave will be detected by the control/communication unit 115 of the source device 110. In this example, depending on whether the reflected wave is detected, the control/communication unit 115 of the source device 110 will detect a binary number "0" or "1."

The control/communication unit 126 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The control/communication unit 126 may also perform an out-of-band communication using a communication channel. The control/communication unit 126 may include a communication module, such as a ZigBee module, a Bluetooth module, or any other communication module known in the art, that the control/communication unit 126 may use to transmit or receive data to or from the source device 110 via the out-of-band communication.

The control/communication unit 126 may receive a wake-up request message from the source device 110, detect an amount of a power received by the target resonator, and transmit, to the source device 110, information about the amount of the power received by the target resonator. In this example, the information about the amount of the power received by the target resonator may correspond to an input voltage value and an input current value of the rectification unit 122, an output voltage value and an output current value of the rectification unit 122, or an output voltage value and an output current value of the DC/DC converter 123.

The control/communication unit 115 may set a resonance bandwidth of the source resonator 116. Based on the set resonance bandwidth of the source resonator 116, a Q-factor $Q_s$ of the source resonator 116 may be determined.

The control/communication unit 126 may set a resonance bandwidth of the target resonator 121. Based on the set resonance bandwidth of the target resonator 121, a Q-factor $Q_D$ of the target resonator 121 may be determined. In this example, the resonance bandwidth of the source resonator 116 may be set to be wider or narrower than the resonance bandwidth of the target resonator 121. By communicating with each other, the source device 110 and the target device 120 may share information regarding the resonance bandwidths of the source resonator 116 and the target resonator 121. When a power higher than a reference value is requested by the target device 120, the Q-factor of the source resonator 116 may be set to a value greater than 100. When a power lower than the reference value is requested by the target device 120, the Q-factor of the source resonator 116 may be set to a value less than 100.

In resonance-based wireless power transmission, a resonance bandwidth is a significant factor. If Qt indicates a Q-factor based on a change in a distance between the source resonator 116 and the target resonator 121, a change in a resonance impedance, impedance-mismatching, a reflected signal, or any other factor affecting a Q-factor, Qt is inversely proportional to a resonance bandwidth as expressed by the following Equation 1:

$$\frac{\Delta_f}{f_0} = \frac{1}{Qt} = \Gamma_{S,D} + \frac{1}{BW_S} + \frac{1}{BW_D} \tag{1}$$

In Equation 1, $f_O$ denotes a center frequency, $\Delta f$ denotes a bandwidth, $\Gamma_{S,D}$ denotes a reflection loss between resonators, $BW_S$ denotes a resonance bandwidth of the source resonator 116, and $BW_D$ denotes a resonance bandwidth of the target resonator 121.

An efficiency U of wireless power transmission may be expressed by the following Equation 2:

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \tag{2}$$

In Equation 2, κ denotes a coupling coefficient of energy coupling between the source resonator 116 and the target resonator 121, $\Gamma_S$ denotes a reflection coefficient of the source resonator 116, $\Gamma_D$ denotes a reflection coefficient of the target resonator 121, $\omega_O$ denotes a resonance frequency, M denotes a mutual inductance between the source resonator 116 and the target resonator 121, $\Gamma_S$ denotes an impedance of the source resonator 116, $\Gamma_D$ denotes an impedance of the target resonator 121, $Q_S$ denotes a Q-factor of the source resonator 116, $Q_D$ denotes a Q-factor of the target resonator 121, and $Q_K$ denotes a Q-factor of energy coupling between the source resonator 116 and the target resonator 121.

As can be seen from Equation 2, the Q-factor has a great effect on an efficiency of the wireless power transmission. Accordingly, the Q-factor may be set to a high value to increase the efficiency of the wireless power transmission. However, even when and $Q_D$ are set to high values, the efficiency of the wireless power transmission may be reduced by a change in the coupling coefficient K of the energy coupling, a change in a distance between the source resonator 116 and the target resonator 121, a change in a resonance impedance, impedance mismatching, and any other factor affecting the efficiency of the wireless power transmission.

If the resonance bandwidths $BW_S$ and $BW_D$ of the source resonator 116 and the target resonator 121 are set to be too narrow to increase the efficiency of the wireless power transmission, impedance mismatching and other undesirable conditions may easily occur due to insignificant external influences. In order to account for the effect of impedance mismatching, Equation 1 may be rewritten as the following Equation 3:

$$\frac{\Delta f}{f_0} = \frac{\sqrt{VSWR} - 1}{Qt\sqrt{VSWR}} \quad (3)$$

In an example in which an unbalanced relationship of a resonance bandwidth or a bandwidth of an impedance matching frequency between the source resonator 116 and the target resonator 121 is maintained, a reduction in an efficiency of the wireless power transmission may be prevented due to a change in the coupling coefficient K, a change in the distance between the source resonator 116 and the target resonator 121, a change in the resonance impedance, impedance mismatching, and any other factor affecting the efficiency of the wireless power transmission.

According to Equation 1 through Equation 3, when the resonance bandwidth between the source resonator 116 and the target resonator 121 or the bandwidth of an impedance-matching frequency remains unbalanced, the Q-factor of the source resonator 116 and the Q-factor of the target resonator 121 may remain unbalanced.

Figure 2:
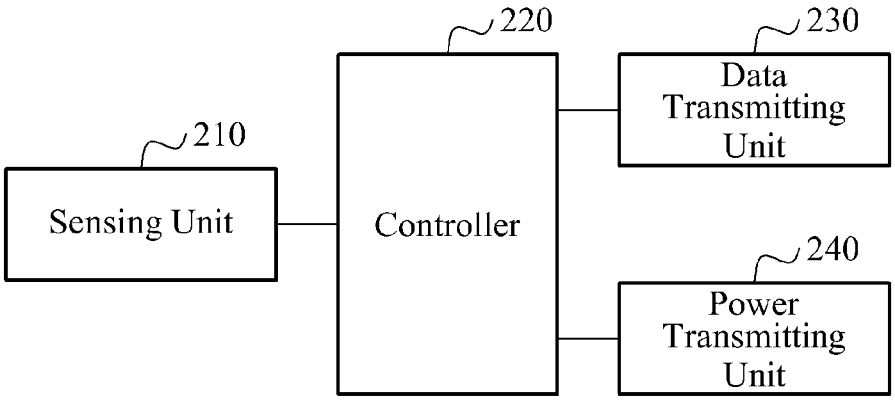
FIG. 2 is a block diagram illustrating an example of an apparatus configured to transmit power and data in a sound system using wireless power transmission.

FIG. 2 illustrates an example of an apparatus configured to transmit power and data in a sound system using wireless power transmission. Referring to FIG. 2, the power and data transmission apparatus includes a sensing unit 210, a controller 220, a data transmitting unit 230, and a power transmitting unit 240. The power and data transmission apparatus, e.g., the source device 110 of FIG. 1, further includes a source resonator, e.g., the source resonator 116 of FIG. 1. A sound output device, e.g., the target device 120 of FIG. 1, includes a target resonator, e.g., the target resonator 121 of FIG. 1.

The sensing unit 210 measures a distance between the source resonator and the target resonator. That is, the sensing unit 210 measures a distance between the power and data transmission apparatus and the sound output device. The sensing unit 210 may measure the distance between the power and data transmission apparatus and the sound output device, using various sensors, for example, an infrared sensor, a photo sensor, and/or other sensors known to one of ordinary skill in the art.

The data transmitting unit 230 may transmit sound data stored in a storage space to the sound output device. The storage space may refer to a memory device. The data transmitting unit 230 may transmit the sound data to the sound output device through magnetic coupling between the source resonator and the target resonator.

Also, the data transmitting unit 230 may transmit, to the sound output device, sound data received from an external device. The external device may include a device storing sound data, for example, a digital video disc (DVD) player, a compact disc (CD) player, a Moving Picture Experts Group (MPEG) Audio Layer 3 (MP3) player, a smartphone, and/or other devices known to one of ordinary skill in the art.

The data transmitting unit 230 may transmit, to the sound output device, sound data received from a broadcasting station in real-time. For example, the data transmitting unit 230 may transmit sound data of a radio broadcast to the sound output device.

The data transmitting unit 230 transmits the sound data via in-band communication if the distance between the source resonator and the target resonator is less than or equal to a predetermined value. The predetermined value may be determined based on a transmission efficiency of the sound data transmitted from the source resonator to the target resonator. The controller 220 may determine, to be the predetermined value, a distance within which the transmission efficiency of the sound data is greater than or equal to a predetermined level. The in-band communication refers to a communication scheme using a resonance frequency between the source resonator and the target resonator.

The data transmitting unit 230 transmits the sound data via out-band communication if the distance between the source resonator and the target resonator is greater than the predetermined value. The out-band communication refers to a communication scheme using a communication channel of a frequency other than the resonance frequency. The data transmitting unit 230 transmits, to the sound output device, control data used to adjust the transmission efficiency of the sound data, in addition to the sound data.

The power transmitting unit 240 transmits power stored in the source resonator to the sound output device through the magnetic coupling. A power supply device (e.g., the power supply 112 of FIG. 1) may supply the power to the source resonator. If the sound data is transmitted to the sound output device via the in-band communication, the power is transmitted to the sound output device, using the resonance frequency, simultaneously.

If the distance between the source resonator and the target resonator is greater than the predetermined value, the power transmitting unit 240 transmits the power to a relay device (as shown later with reference to FIGS. 4-7 and 9) positioned within a distance less than or equal to the predetermined value. The relay device receives the power from the power transmitting unit 240, and may transfer the received power to the sound output device. If a distance between the relay device and the sound output device is greater than a predetermined value, the relay device may transfer the received power to another relay device positioned between the relay device and the sound output device.

The controller 220 controls operations of the data transmitting unit 230 and the power transmitting unit 240 based on the distance between the source resonator and the target resonator. If the distance between the source resonator and the target resonator is less than or equal to the predetermined value, the controller 220 controls the operations of the data transmitting unit 230 and the power transmitting unit 240 to transmit the sound data and the power to the sound output device, simultaneously.

Conversely, if the distance between the source resonator and the target resonator is greater than the predetermined value, the controller 220 controls the operations of the data transmitting unit 230 and the power transmitting unit 240 to transmit only the sound data to the sound output device. In this example, the controller 220 controls the operation of the power transmitting unit 240 to transmit the power to the relay device.

The controller 220 controls an overall operation of the power and data transmission apparatus, and may perform operations of the sensing unit 210, the data transmitting unit 230, and the power transmitting unit 240. That is, to individually describe the operations of the sensing unit 210, the data transmitting unit 230, and the power transmitting unit

240, the sensing unit 210, the data transmitting unit 230, and the power transmitting unit 240 are separately illustrated in FIG. 2. However, when the power and data transmission apparatus of FIG. 2 is actually implemented, the controller 220 may be configured to perform all of the operations, or only a portion of the operations.

The sound output device may include speakers. Each of the speakers may be configured in a hexahedral form. Each face of the hexahedral speaker may include a resonator configured to perform magnetic coupling. The hexahedral speaker may receive power and sound data through the resonator disposed on each face of the hexahedral speaker. Also, the hexahedral speaker may transfer the received power to another speaker through the resonator disposed on each face of the hexahedral speaker.

The sound output device may include a power storage device configured to maintain a constant input impedance of the sound output device. An output impedance of the sound output device may be changed based on a required output level. The power storage device may provide variable power based on the output impedance that may be changed. However, since the sound output device may wirelessly receive power corresponding to a predetermined capacity of the power storage device, the input impedance of the sound output device may be maintained to be constant.

Figure 3:
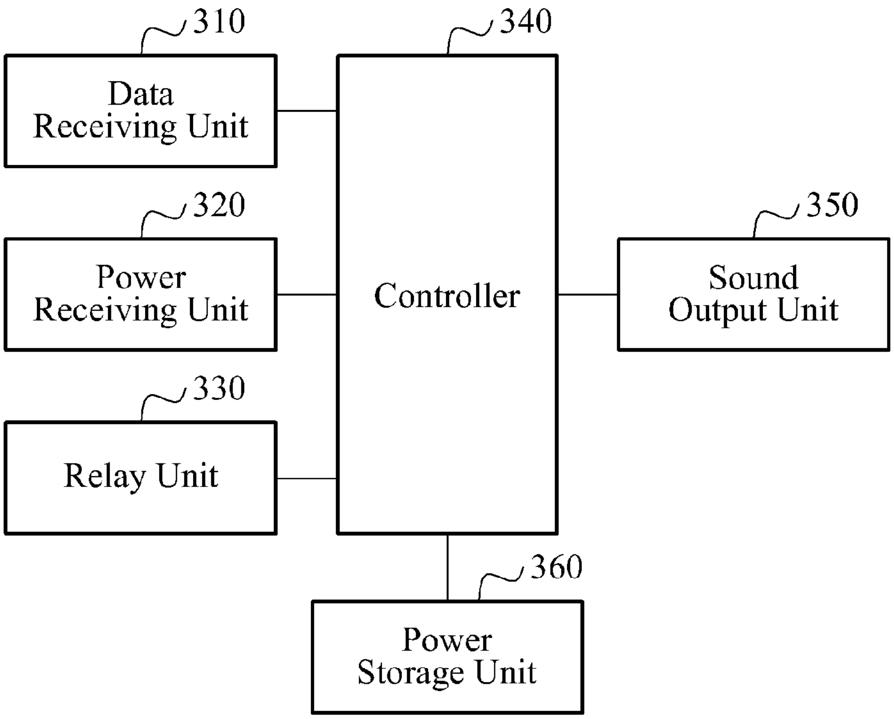
FIG. 3 is a block diagram illustrating an example of an apparatus configured to receive power and data in a sound system using wireless power transmission.

FIG. 3 illustrates an example of an apparatus configured to receive power and data in a sound system using wireless power transmission. Referring to FIG. 3, the power and data reception apparatus includes a data receiving unit 310, a power receiving unit 320, a relay unit 330, a controller 340, a sound output unit 350, and a power storage unit 360. An apparatus configured to transmit power and data, e.g., the source device 110 of FIG. 1, includes a source resonator, e.g., the source resonator 116 of FIG. 1. The power and data reception apparatus, e.g., the target device 120 of FIG. 1, further includes a target resonator, e.g., the target resonator 121 of FIG. 1. The power and data reception apparatus corresponds to a sound output device.

The data receiving unit 310 receives sound data transmitted by the power and data transmission apparatus. The data receiving unit 310 may receive the sound data through magnetic coupling between the source resonator and the target resonator. The sound data may correspond to data modulated based on an amount of power transmitted through the magnetic coupling. The power receiving unit 320 receives power transmitted by the source resonator through the magnetic coupling.

The sound output unit 350 amplifies the sound data based on a requested output level (e.g., of volume), and outputs the amplified sound data. The sound output unit 350 includes an amplifier configured to amplify the sound data. The requested output level is determined by the controller 340. The controller 340 may determine the requested output level based on data received by the data receiving unit 310. Also, the controller 340 may determine the requested output level based on an external input.

The relay unit 330 transfers, to another sound output device, the power received by the power receiving unit 320. In this example, the data receiving unit 310 may receive data about the other sound output device. The data about the other sound output device may include, for example, an identifier of the other sound output device, location information of the other sound output device, a distance from the other sound output device, and/or other information known to one of ordinary skill in the art. The relay unit 330 may transfer the received power based on the data about the other sound output device. If the data about the other sound output device is received by the data receiving unit 310, the controller 340 determines whether the relay unit 330 is to be operated based on the data about the other sound output device. For example, if a distance between the sound output device and the other sound output device is less than or equal to a predetermined value, the controller 340 controls the relay unit 330 to transfer the received power to the other sound output device.

The power storage unit 360 is disposed between the power receiving unit 320 and the sound output unit 350 to store a predetermined amount of power, and variably transfers the stored power to the sound output unit 350 based on the requested output level. Since the power storage unit 360 stores the predetermined amount of power, the power receiving unit 320 receives power corresponding to the predetermined amount of power.

The controller 340 controls an overall operation of the power and data reception apparatus, and may perform operations of the data receiving unit 310, the power receiving unit 320, the relay unit 330, and the power storage unit 360. That is, to individually describe the operations of the data receiving unit 310, the power receiving unit 320, the relay unit 330, and the power storage unit 360, the data receiving unit 310, the power receiving unit 320, the relay unit 330, and the power storage unit 360 are separately illustrated in FIG. 3. However, when the power and data reception apparatus of FIG. 3 is actually implemented, the controller 340 may be configured to perform all of the operations, or only a portion of the operations.

Figure 4:
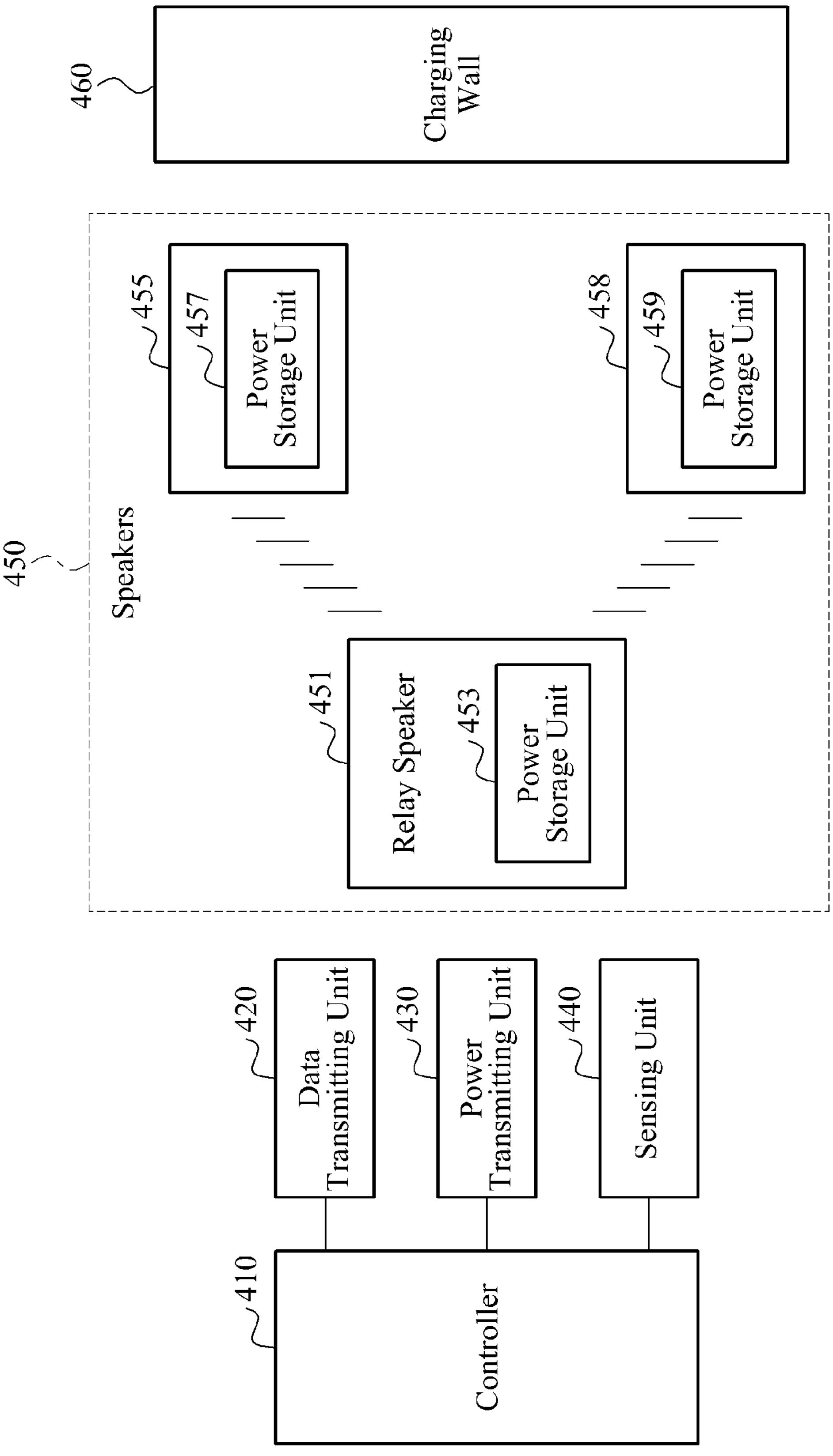
FIG. 4 is a block diagram illustrating an example of a sound system using wireless power transmission.

FIG. 4 illustrates an example of a sound system using wireless power transmission. Referring to FIG. 4, the sound system includes a controller 410, a data transmitting unit 420, a power transmitting unit 430, a sensing unit 440, speakers 450, and a charging wall 460. The controller 410, the data transmitting unit 420, the power transmitting unit 430, and the sensing unit 440 may correspond to the power and data transmission apparatus of FIG. 2 that includes a source resonator, e.g., the source resonator 116 of FIG. 1. Each of the speakers 450 may correspond to the power and data reception apparatus of FIG. 3 that includes a respective target resonator, e.g., the target resonator 121 of FIG. 1.

The data transmitting unit 420 may transmit sound data stored in a storage space to the speakers 450. The data transmitting unit 420 may transmit the sound data through magnetic coupling between the source resonator and the respective target resonator of each of the speakers 450. The data transmitting unit 420 may transmit, to the speakers 450, sound data received from a broadcasting station in real-time. For example, the data transmitting unit 420 may transmit sound data of a radio broadcast to the speakers 450.

The sound data may include multichannel sound data generated based on a number of the speakers 450. For example, if the speakers 450 are configured to use a 5.1 channel surround sound format, the sound data may include sound data of the 5.1 channel surround sound format.

The power transmitting unit 430 transmits power stored in the source resonator to the speakers 450 through the magnetic coupling. A power supply device (the power supply 112 of FIG. 1) may supply the power to the source resonator.

The speakers 450 receive the sound data and the power through the magnetic coupling. The speakers 450 amplify the sound data based on a requested output level (e.g., of volume), and output the amplified sound data. Each of the speakers 450 include a respective amplifier configured to amplify the sound data. The requested output level may be determined by the controller 410. The controller 410 may determine the requested output level based on data received by the controller 410. Also, the controller 410 may determine the requested output level based on an external input.

At least one of the speakers 450 operates as a relay speaker 451. The relay speaker 451 receives the power through the magnetic coupling, and may transfer at least a portion of the received power to a 455. Also, the relay speaker 451 may transfer another portion of the received power to a speaker 458. Each of the relay speaker 451, the speaker 455, and the speaker 458 may correspond to the power and data reception apparatus of FIG. 3 that includes the respective target resonator.

Each of the speakers 450 includes a respective power storage unit. The power storage unit stores a predetermined amount of power. The power storage unit variably transfers the power to the respective amplifier based on the requested output level. For example, the relay speaker 451, the speaker 455, and the speaker 458 includes a power storage unit 453, a power storage unit 457, and a power storage unit 459, respectively.

The sensing unit 440 measures a distance between the source resonator and the respective target resonator of each of the speakers 450. The controller 410 may determine the multichannel sound data of matching each of the speakers 450 based on the distance between the source resonator and the respective target resonator of each of the speakers 450. For example, if the multichannel sound data includes the sound data of the 5.1 channel surround sound format, the controller 410 determines sound data matching a woofer, sound data matching a front speaker, sound data matching nearby left and right speakers, and sound data matching remote left and right speakers. The controller 410 may classify the speakers 450 into nearby speakers and remote speakers based on a distance from the source resonator.

The remote speakers may receive power from the charging wall 460. The charging wall 460 may be disposed at a predetermined distance from the remote speakers, and receives the power from the power supply device. The charging wall includes a source resonator. The power is transferred through magnetic coupling between the source resonator of the charging wall 460 and target resonators of the remote speakers.

Figure 5:
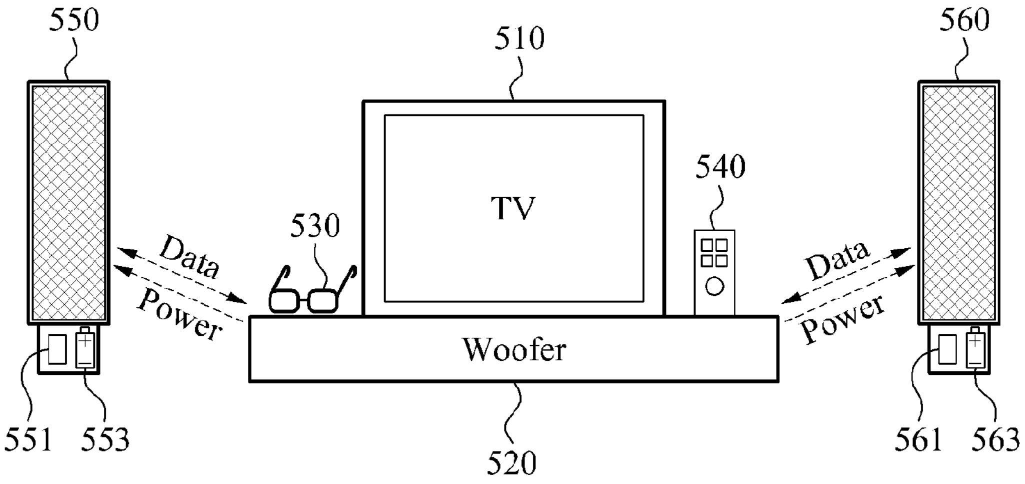
FIG. 5 is a diagram illustrating a detailed example of a sound system using wireless power transmission.

FIG. 5 illustrates a detailed example of a sound system using wireless power transmission. Referring to FIG. 5, a television (TV) 510 provides sound data for broadcasting. If a source resonator is included in the TV 510, the TV 510 may wirelessly transmit the sound data to a woofer 520, a speaker 550, and a speaker 560 through the source resonator. If a respective target resonator is included in each of the woofer 520, the speaker 550, and the speaker 560, each of the woofer 520, the speaker 550, and the speaker 560 may wirelessly receive the sound data from the TV 510 through magnetic coupling between the source resonator and the respective target resonator.

If the source resonator is included in the TV 510, the TV 510 may further wirelessly transmit power. The TV 510 may receive power supplied from a 220 volt (V) power source. The TV 510 may transmit the power to the woofer 520, three-dimensional (3D) glasses 530, a remote control 540, the speaker 550, and the speaker 560 through the magnetic coupling. If the respective target resonator is included in each of the woofer 520, the 3D glasses 530, the remote control 540, the speaker 550, and the speaker 560, the woofer 520, the 3D glasses 530, the remote control 540, the speaker 550, and the speaker 560 may further wirelessly receive the power from the TV 510 through the magnetic coupling.

If the TV 510 transmits the sound data to the woofer 520 in a wireless or wired manner, the woofer 520 may wirelessly transmit the sound data to the speaker 550 and the speaker 560. If power is supplied from a power source to the woofer 520, the woofer 520 may wirelessly transmit the power to the TV 510, the 3D glasses 530, the remote control 540, the speaker 550, and the speaker 560.

The speaker 550 includes a power source 551 and a battery 553 configured to receive and store a predetermined amount of power. The speaker 550 receives power from the power source 551 and/or the battery 553. The speaker 560 includes a power source 561 and a battery 563 configured to receive and store a predetermined amount of power. The speaker 560 receives power from the power source 561 and/or the battery 563. If the TV 510 transmits the sound data to the speaker 550 and the speaker 560, the speaker 550 and the speaker 560 may wirelessly transmit the sound data to the woofer 520.

Figure 6:
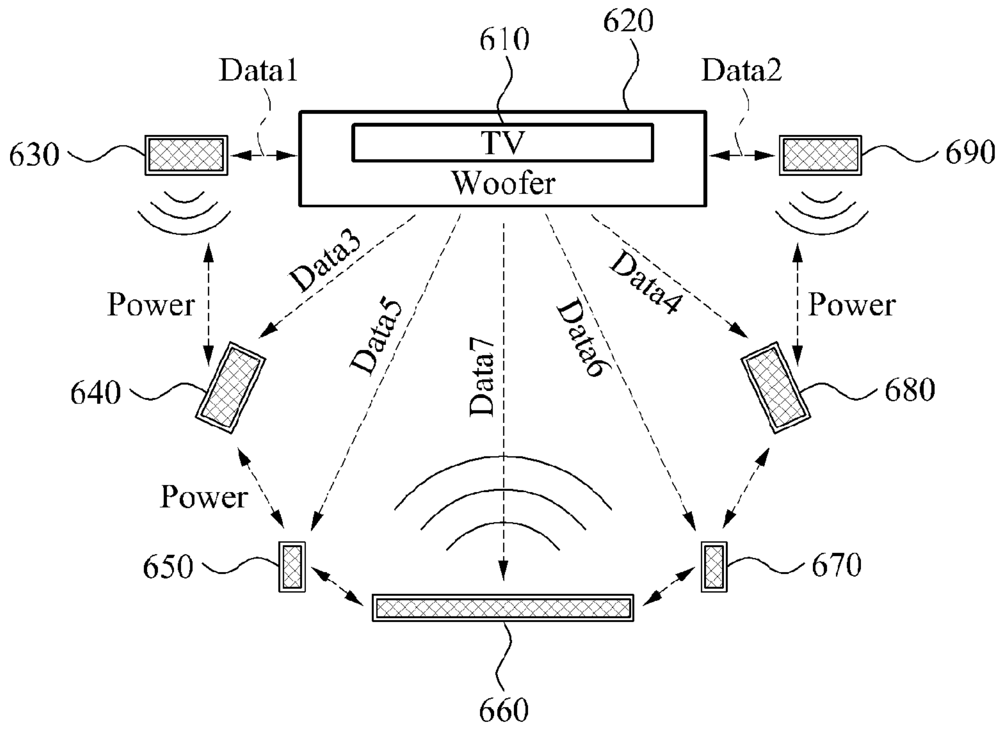
FIG. 6 is a diagram illustrating another detailed example of a sound system using wireless power transmission.

FIG. 6 illustrates another detailed example of a sound system using wireless power transmission. Referring to FIG. 6, a TV 610 may transmit sound data for broadcasting and power. The TV 610 includes a source resonator. A woofer 620 and speakers 630, 640, 650, 660, 670, 680, and 690 are positioned in various directions and at various distances from the TV 610. Each of the woofer 620 and the speakers 630, 640, 650, 660, 670, 680, and 690 include a respective target resonator. Accordingly, the TV 610 may wirelessly transmit the sound data and the power to each of the woofer 620 and the speakers 630, 640, 650, 660, 670, 680, and 690 through magnetic coupling between the source resonator and the respective target resonator. For example, the TV 610 may wirelessly transfer Data1, Data2, Data3, Data4, Data5, Data6, and Data7 to the speakers 630, 640, 650, 660, 670, 680, and 690, respectively, based on locations of the speakers 630, 640, 650, 660, 670, 680, and 690.

In examples, the TV 610 may wirelessly transmit the sound data and the power to the woofer 620, simultaneously. The TV 610 may wirelessly transmit the Data1 and the power to the speaker 630, simultaneously. The TV 610 may wirelessly transmit the Data2 and the power to the speaker 690, simultaneously. The TV 610 may wirelessly transmit the Data3 to the speaker 640. If a distance between the TV 610 and the speaker 640 is greater than a predetermined value, the TV 610 may not wirelessly transmit the power to the speaker 640, and instead, the speaker 630 may wirelessly transfer Power to the speaker 640. In this example, the speaker 630 is referred to as being operated as a relay device.

The TV 610 may wirelessly transmit the Data4 to the speaker 680. The speaker 690 may wirelessly transfer Power to the speaker 680. In this example, the speaker 690 is referred to as being operated as a relay device.

The TV 610 may wirelessly transmit the Data5 to the speaker 650. The speaker 640 may wirelessly transfer Power to the speaker 650. In this example, the speaker 640 is referred to as being operated as a relay device.

The TV 610 may wirelessly transmit the Data6 to the speaker 670. The speaker 680 may wirelessly transfer the power to the speaker 670. In this example, the speaker 680 is referred to as being operated as a relay device.

The TV 610 may wirelessly transmit the Data7 to the speaker 660. The speaker 650 and the speaker 670 may wirelessly transfer the power to the speaker 660. In this example, the speaker 650 and the speaker 670 are referred to as being operated as relay devices.

The woofer 620 may receive the sound data from the TV 610 in a wireless or wired manner. In this example, the woofer 620 may wirelessly transmit the sound data to the speakers 630, 640, 650, 660, 670, 680, and 690.

Figure 7:
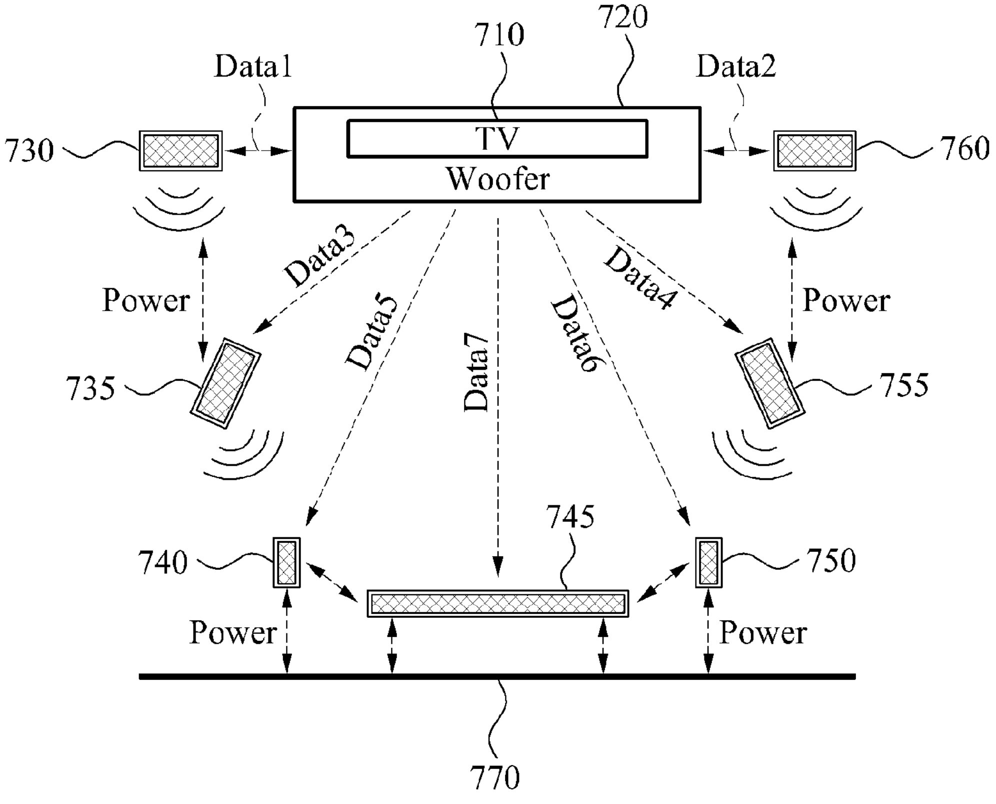
FIG. 7 is a diagram illustrating still another detailed example of a sound system using wireless power transmission.

FIG. 7 illustrates still another detailed example of a sound system using wireless power transmission. Referring to FIG. 7, a TV 710 may transmit sound data for broadcasting and power. The TV 710 includes a source resonator. A woofer 720 and speakers 730, 735, 740, 745, 750, 755, and 760 are positioned in various directions and at various distances from the TV 710. Each of the woofer 720 and the speakers 730, 735, 740, 745, 750, 755, and 760 include a respective target resonator. Accordingly, the TV 710 may wirelessly transmit the sound data and the power to each of the woofer 720 and the speakers 730, 735, 740, 745, 750, 755, and 760 through magnetic coupling between the source resonator and the respective target resonator. For example, the TV 710 may wirelessly transfer Data1, Data2, Data3, Data4, Data5, Data6, and Data7 to the speakers 730, 735, 740, 745, 750, 755, and 760, respectively, based on locations of the speakers 730, 735, 740, 745, 750, 755, and 760.

In examples, the TV 710 may wirelessly transmit the sound data and the power to the woofer 720, simultaneously. The TV 710 may wirelessly transmit the Data1 and the power to the speaker 730, simultaneously. The TV 710 may wirelessly transmit the Data2 and the power to the speaker 760, simultaneously.

The TV 710 may wirelessly transmit the Data3 to the speaker 735. If a distance between the TV 710 and the speaker 735 is greater than a predetermined value, the TV 710 may not wirelessly transmit the power to the speaker 735, and instead, the speaker 730 may wirelessly transfer Power to the speaker 735. In this example, the speaker 730 is referred to as being operated as a relay device.

The TV 710 may wirelessly transmit the Data4 to the speaker 755. The speaker 760 may wirelessly transfer Power to the speaker 755. In this example, the speaker 760 is referred to as being operated as a relay device.

The TV 710 may wirelessly transmit the Data5 to the speaker 740. The TV 710 may wirelessly transmit the Data6 to the speaker 750. The TV 710 may wirelessly transmit the Data7 to the speaker 745. The speaker 740, the speaker 745, and the speaker 750 may wirelessly receive Power from a charging wall 770 including a source resonator. The charging wall 770 receives power supplied from a power source, and is disposed at a predetermined distance from the speaker 740, the speaker 745, and the speaker 750. The predetermined distance may refer to a distance within which a power transmission efficiency is greater than or equal to a predetermined value. The speaker 740, the speaker 745, and the speaker 750 may further transfer the power with each other.

The woofer 720 may receive the sound data from the TV 710 in a wireless or wired manner. In this example, the woofer 620 may wirelessly transmit the sound data to the speakers 730, 735, 740, 745, 750, 755, and 760.

Figure 8:
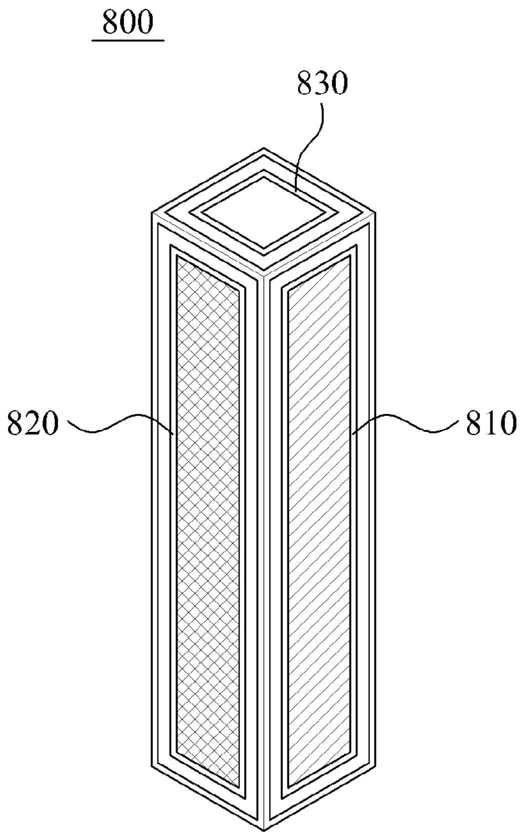
FIG. 8 is a diagram illustrating an example of a speaker in a sound system using wireless power transmission.

FIG. 8 illustrates an example of a speaker 800 in a sound system using wireless power transmission. Referring to FIG. 8, the speaker 800 is configured in a hexahedral form. A resonator 810, a resonator 820, and a resonator 830 are disposed on faces of the speaker 800, respectively. Although not shown in FIG. 8, resonators are disposed on other respective faces of the speakers 800 as well. The speaker 800 receives power irrespective of its location, and transfers the received power to another speaker if operating as a relay device.

Figure 9:
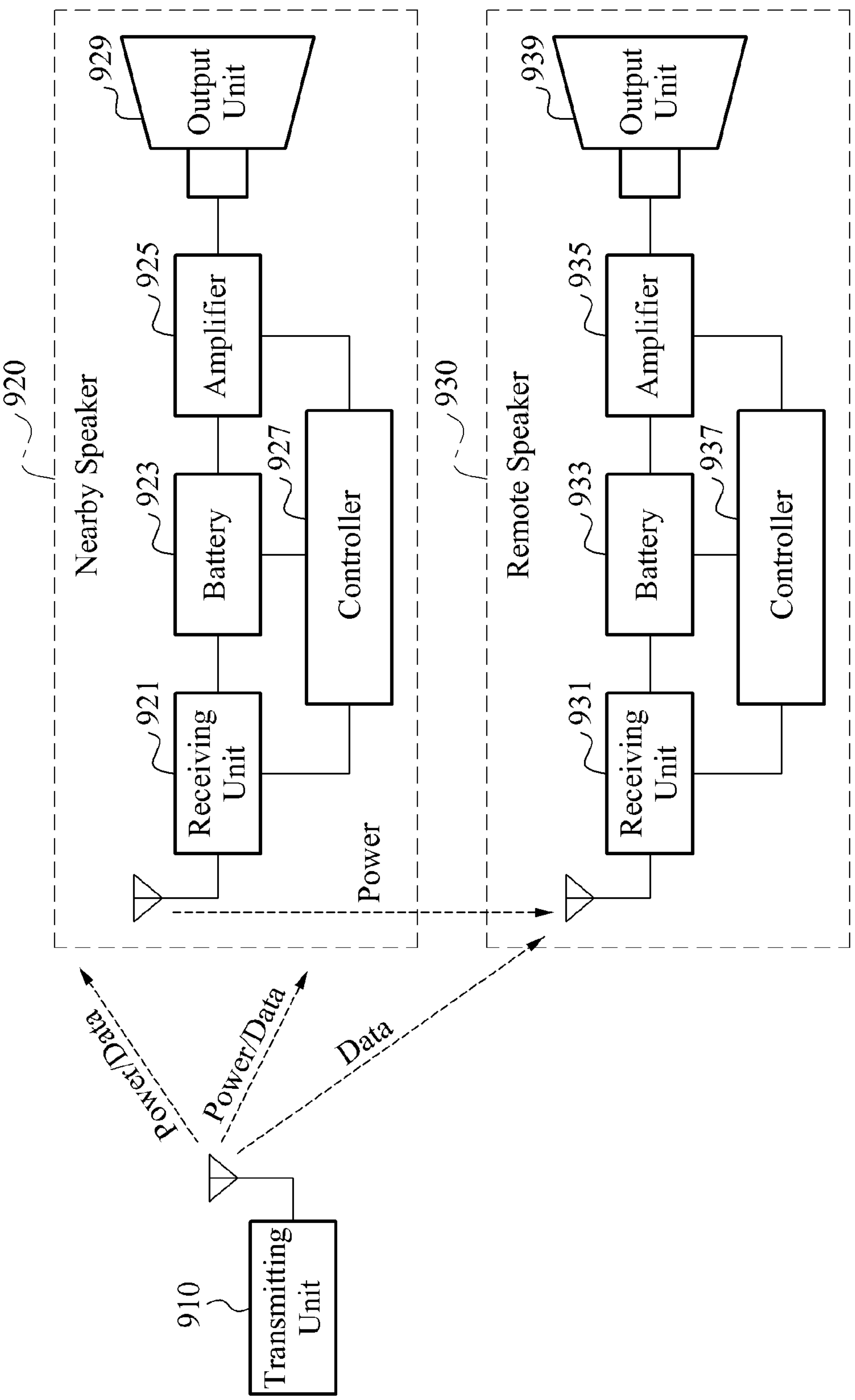
FIG. 9 is a diagram illustrating examples of a nearby speaker and a remote speaker in a sound system using wireless power transmission.

FIG. 9 illustrates examples of a nearby speaker 920 and a remote speaker 930 in a sound system using wireless power transmission. Referring to FIG. 9, the nearby speaker 920 includes a receiving unit 921, a battery 923, an amplifier 925, a controller 927, and an output unit 929. The remote speaker 930 includes a receiving unit 931, a battery 933, an amplifier 935, a controller 937, and an output unit 939.

A transmitting unit 910 wirelessly transmits power and data to the nearby speaker 920. The data may include, for example, sound data and control data. The nearby speaker 920 receives the power and the data through the receiving unit 921. The receiving unit 921 processes the sound data to generate sounds of an analog signal in an audible frequency band.

A battery 923 is charged using the received power. A controller 927 determines a requested output level (e.g., of volume) of the sounds based on the control data, or determines the requested output level based on an input of a user. An amplifier 925 amplifies the sounds based on the requested output level. The battery 923 transfers, to the amplifier 925, power corresponding to the requested output level. An output unit 929 outputs the sounds amplified to the requested output level.

The transmitting unit 910 wirelessly transmits data to the remote speaker 930. The data may include, for example, sound data and control data. The remote speaker 930 receives the data through the receiving unit 931. The receiving unit 931 processes the sound data to generate sounds of an analog signal in an audible frequency band.

If a distance between the transmitting unit 910 and the remote speaker 930 is greater than a predetermined value, a power transmission efficiency may decrease. Accordingly, the transmitting unit 910 wirelessly transmits power to the remote speaker 930, using the nearby speaker 920 as a relay device. The receiving unit 931 receives the power from the nearby speaker 920, namely, the receiving unit 921.

A battery 933 is charged using the received power. A controller 937 determines a requested output level (e.g., of volume) of the sounds based on the control data, or determines the requested output level based on an input of a user. An amplifier 935 amplifies the sounds based on the requested output level. The battery 933 transfers, to the amplifier 935, power corresponding to the requested output level. An output unit 939 outputs the sounds amplified to the requested output level.

Figure 10:
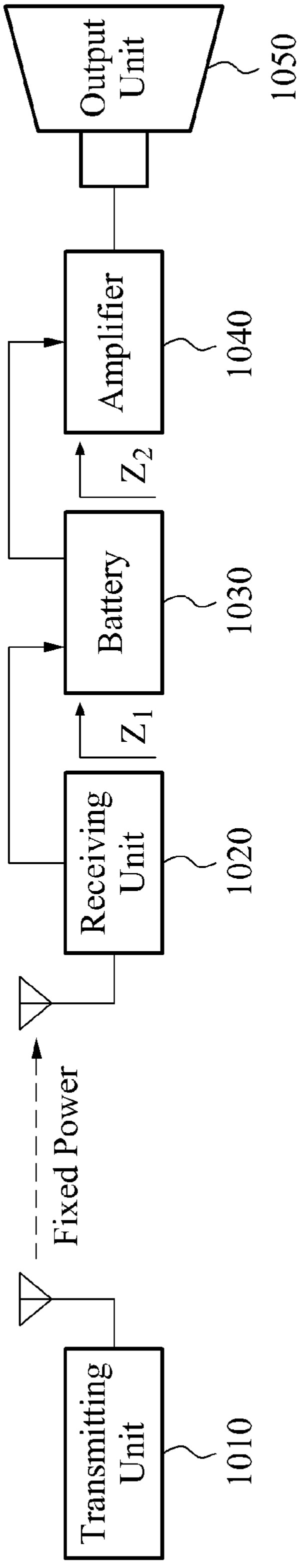
FIG. 10 is a diagram illustrating an example of a speaker including a battery, in a sound system using wireless power transmission.

FIG. 10 illustrates an example of a speaker including a battery, in a sound system using wireless power transmission. Referring to FIG. 10, the speaker includes a receiving unit 1020, a battery 1030, an amplifier 1040, and an output unit 1050.

The output unit 1050 outputs a sound of an output level (e.g., of volume) that may be changed based on an intensity of the sound to be output. If the output level is changed, an amount of power required the amplifier 1040 is also changed. That is, an input impedance $Z_2$ of the amplifier 1040 includes a variable value. If the battery 1030 is absent from the speaker, an amount of power to be received by the receiving unit 1020 may need to be varied based on the amount of the power required by the amplifier 1040. However, if the amount of the power to be received by the receiving unit 1020 is varied, stability of the sound system may decrease.

Accordingly, the battery 1030 is included in the speaker between the receiving unit 1020 and the amplifier 1040, and stores a predetermined amount of power. As such, an input impedance $Z_1$ of the battery 1030 includes a fixed value. Since the battery 1030 includes the input impedance $Z_1$ of the fixed value, the receiving unit 1020 receives fixed power corresponding to a predetermined capacity of the battery 1030, and provides the fixed power to the battery 1030. The battery 1030 provides variable power to the amplifier 1040 based on the amount of power required by the amplifier 1040.

A transmitting unit 1010 transmits, to the receiving unit 1020, the fixed power corresponding to the predetermined capacity of the battery 1030. Through the battery 1030, the sound system receives power stably, and the battery 1030 provides, to the amplifier 1040, the variable power based on the output level of the sound to be output.

In the following description, the term "resonator" used in the discussion of FIGS. 11A through 13B refers to both a source resonator and a target resonator.

Figure 11A:
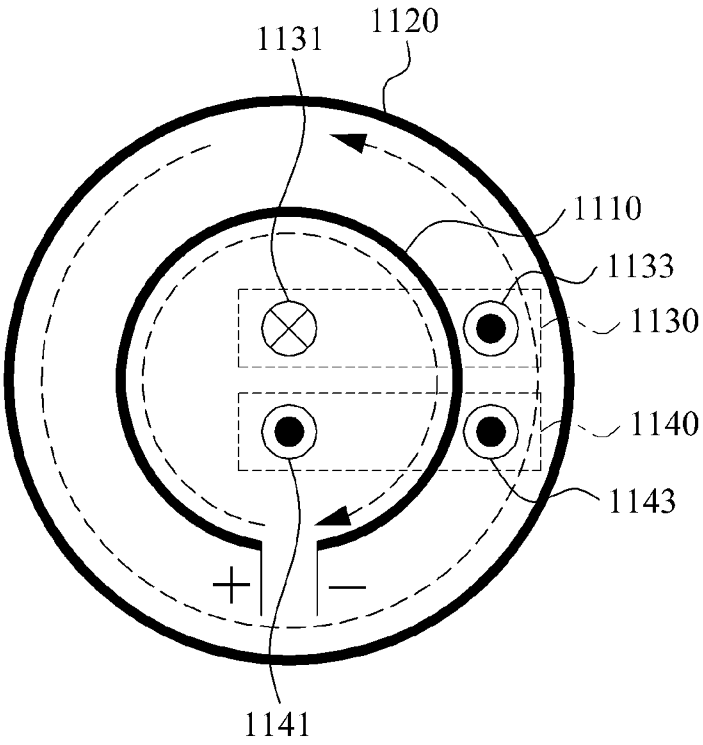
FIGS. 11A through 11B are diagrams illustrating examples of a distribution of a magnetic field in a feeder and a resonator of a wireless power transmitter.
Figure 11B:
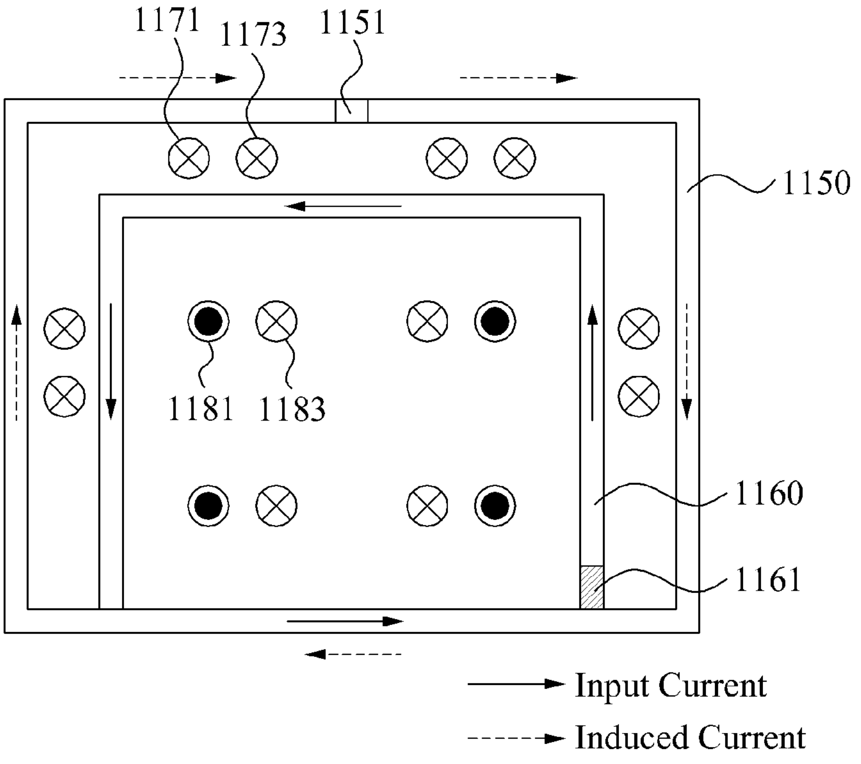

FIGS. 11A and 11B are diagrams illustrating examples of a distribution of a magnetic field in a feeder and a resonator of a wireless power transmitter. When a resonator receives power supplied through a separate feeder, magnetic fields are formed in both the feeder and the resonator.

FIG. 11A illustrates an example of a structure of a wireless power transmitter in which a feeder 1110 and a resonator 1120 do not have a common ground. Referring to FIG. 11A, as an input current flows into a feeder 1110 through a terminal labeled "+" and out of the feeder 1110 through a terminal labeled "−", a magnetic field 1130 is formed by the input current. A direction 1131 of the magnetic field 1130 inside the feeder 1110 is into the plane of FIG. 11A, and has a phase that is opposite to a phase of a direction 1133 of the magnetic field 1130 outside the feeder 1110. The magnetic field 1130 formed by the feeder 1110 induces a current to flow in a resonator 1120. The direction of the induced current in the resonator 1120 is opposite to a direction of the input current in the feeder 1110 as indicated by the dashed arrows in FIG. 11A.

The induced current in the resonator 1120 forms a magnetic field 1140. Directions of the magnetic field 1140 are the same at all positions inside the resonator 1120. Accordingly, a direction 1141 of the magnetic field 1140 formed by the resonator 1120 inside the feeder 1110 has the same phase as a direction 1143 of the magnetic field 1140 formed by the resonator 1120 outside the feeder 1110.

Consequently, when the magnetic field 1130 formed by the feeder 1110 and the magnetic field 1140 formed by the resonator 1120 are combined, a strength of the total magnetic field inside the resonator 1120 decreases inside the feeder 1110 and increases outside the feeder 1110. In an example in which power is supplied to the resonator 1120 through the feeder 1110 configured as illustrated in FIG. 11A, the strength of the total magnetic field decreases in the center of the resonator 1120, but increases outside the resonator 1120. In another example in which a magnetic field is randomly distributed in the resonator 1120, it is difficult to perform impedance matching since an input impedance will frequently vary. Additionally, when the strength of the total magnetic field increases, an efficiency of wireless power transmission increases. Conversely, when the strength of the total magnetic field is decreases, the efficiency of wireless power transmission decreases. Accordingly, the power transmission efficiency may be reduced on average.

FIG. 11B illustrates an example of a structure of a wireless power transmitter in which a resonator 1150 and a feeder 1160 have a common ground. The resonator 1150 includes a capacitor 1151. The feeder 1160 receives a radio frequency (RF) signal via a port 1161. When the RF signal is input to the feeder 1160, an input current is generated in the feeder 1160. The input current flowing in the feeder 1160 forms a magnetic field, and a current is induced in the resonator 1150 by the magnetic field. Additionally, another magnetic field is formed by the induced current flowing in the resonator 1150. In this example, a direction of the input current flowing in the feeder 1160 has a phase opposite to a phase of a direction of the induced current flowing in the resonator 1150. Accordingly, in a region between the resonator 1150 and the feeder 1160, a direction 1171 of the magnetic field formed by the input current has the same phase as a direction 1173 of the magnetic field formed by the induced current, and thus the strength of the total magnetic field increases in the region between the resonator 1150 and the feeder 1160. Conversely, inside the feeder 1160, a direction 1181 of the magnetic field formed by the input current has a phase opposite to a phase of a direction 1183 of the magnetic field formed by the induced current, and thus the strength of the total magnetic field decreases inside the feeder 1160. Therefore, the strength of the total magnetic field decreases in the center of the resonator 1150, but increases outside the resonator 1150.

An input impedance may be adjusted by adjusting an internal area of the feeder 1160. The input impedance refers to an impedance viewed in a direction from the feeder 1160 to the resonator 1150. When the internal area of the feeder 1160 is increased, the input impedance is increased. Conversely, when the internal area of the feeder 1160 is decreased, the input impedance is decreased. Because the magnetic field is randomly distributed in the resonator 1150 despite a reduction in the input impedance, a value of the input impedance may vary based on a location of a target device. Accordingly, a separate matching network may be required to match the input impedance to an output impedance of a power amplifier. For example, when the input impedance is increased, a separate matching network may be used to match the increased input impedance to a relatively low output impedance of the power amplifier.

Figure 12A:
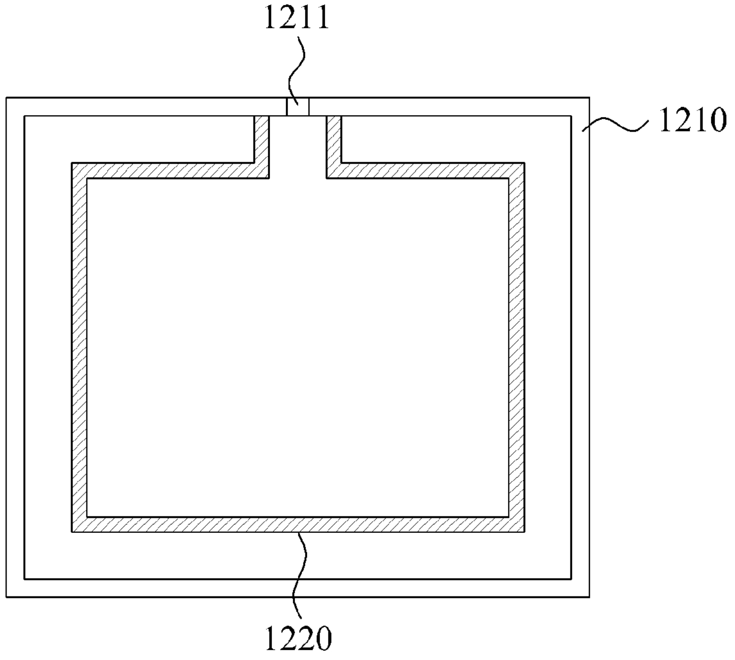
FIGS. 12A and 12B are diagrams illustrating an example of a feeding unit and a resonator of a wireless power transmitter.
Figure 12B:
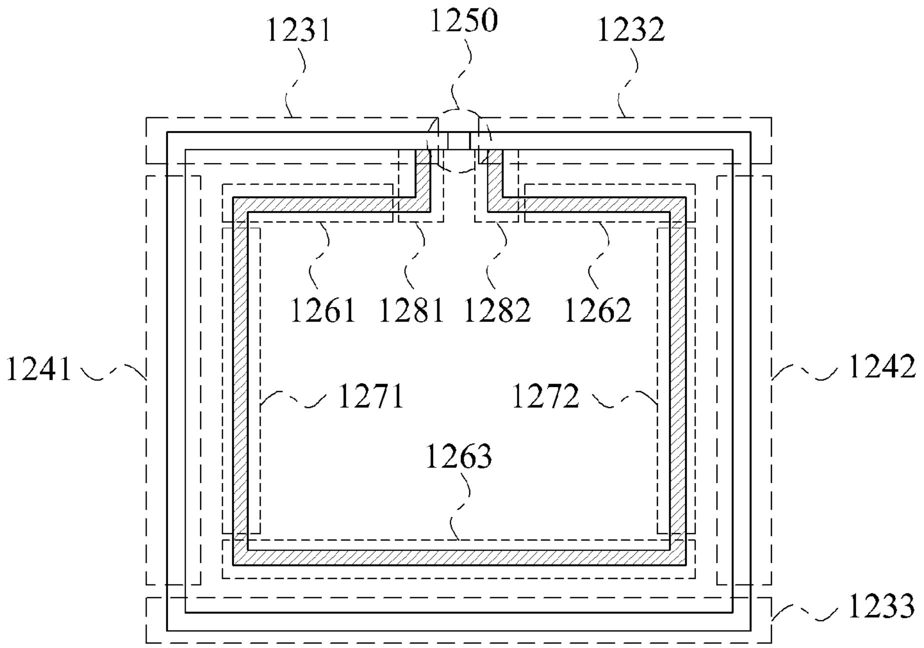

FIGS. 12A and 12B are diagrams illustrating an example of a feeding unit and a resonator of a wireless power transmitter. Referring to FIG. 12A, the wireless power transmitter includes a resonator 1210 and a feeding unit 1220. The resonator 1210 further includes a capacitor 1211. The feeding unit 1220 is electrically connected to both ends of the capacitor 1211.

FIG. 12B illustrates, in greater detail, a structure of the wireless power transmitter of FIG. 12A. The resonator 1210 includes a first transmission line (not identified by a reference numeral in FIG. 12B, but formed by various elements in FIG. 12B as discussed below), a first conductor 1241, a second conductor 1242, and at least one capacitor 1250.

The capacitor 1250 is inserted in series between a first signal conducting portion 1231 and a second signal conducting portion 1232, causing an electric field to be confined within the capacitor 1250. Generally, a transmission line includes at least one conductor in an upper portion of the transmission line, and at least one conductor in a lower portion of first transmission line. A current may flow through the at least one conductor disposed in the upper portion of the first transmission line, and the at least one conductor disposed in the lower portion of the first transmission line may be electrically grounded. In this example, a conductor disposed in an upper portion of the first transmission line in FIG. 12B is separated into two portions that will be referred to as the first signal conducting portion 1231 and the second signal conducting portion 1232. A conductor disposed in a lower portion of the first transmission line in FIG. 12B will be referred to as a first ground conducting portion 1233.

As illustrated in FIG. 12B, the resonator 1210 has a generally two-dimensional (2D) structure. The first transmission line includes the first signal conducting portion 1231 and the second signal conducting portion 1232 in the upper portion of the first transmission line, and includes the first ground conducting portion 1233 in the lower portion of the first transmission line. The first signal conducting portion 1231 and the second signal conducting portion 1232 are disposed to face the first ground conducting portion 1233. A current flows through the first signal conducting portion 1231 and the second signal conducting portion 1232.

One end of the first signal conducting portion 1231 is connected to one end of the first conductor 1241, the other end of the first signal conducting portion 1231 is connected to the capacitor 1250, and the other end of the first conductor 1241 is connected to one end of the first ground conducting portion 1233. One end of the second signal conducting portion 1232 is connected to one end of the second conductor 1242, the other end of the second signal conducting portion 1232 is connected to the other end of the capacitor 1250, and the other end of the second conductor 1242 is connected to the other end of the ground conducting portion 1233. Accordingly, the first signal conducting portion 1231, the second signal conducting portion 1232, the first ground conducting portion 1233, the first conductor 1241, and the second conductor 1242 are connected to each other, causing the resonator 1210 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

The capacitor 1250 is inserted into an intermediate portion of the first transmission line. In the example in FIG. 12B, the capacitor 1250 is inserted into a space between the first signal conducting portion 1231 and the second signal conducting portion 1232. The capacitor 1250 may be a lumped element capacitor, a distributed capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 1250 inserted into the first transmission line may cause the resonator 1210 to have a characteristic of a metamaterial. A metamaterial is a material having a predetermined electrical property that is not found in nature, and thus may have an artificially designed structure. All materials existing in nature have a magnetic permeability and permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and other metamaterial classifications known to one of ordinary skill in the art based on a sign of the magnetic permeability of the metamaterial and a sign of the permittivity of the metamaterial.

If the capacitor 1250 is a lumped element capacitor and a capacitance of the capacitor 1250 is appropriately determined, the resonator 1210 may have a characteristic of a metamaterial. If the resonator 1210 is caused to have a negative magnetic permeability by appropriately adjusting the capacitance of the capacitor 1250, the resonator 1210 may also be referred to as an MNG resonator. Various criteria may be applied to determine the capacitance of the capacitor 1250. For example, the various criteria may include a criterion for enabling the resonator 1210 to have the characteristic of the metamaterial, a criterion for enabling the resonator 1210 to have a negative magnetic permeability at a target frequency, a criterion for enabling the resonator 1210 to have a zeroth order resonance characteristic at the target frequency, and any other suitable criterion. Based on any one or any combination of the aforementioned criteria, the capacitance of the capacitor 1250 may be appropriately determined.

The resonator 1210, hereinafter referred to as the MNG resonator 1210, may have a zeroth order resonance characteristic of having a resonance frequency when a propagation constant is "0". If the MNG resonator 1210 has the zeroth order resonance characteristic, the resonance frequency is independent of a physical size of the MNG resonator 1210. By changing the capacitance of the capacitor 1250, the resonance frequency of the MNG resonator 1210 may be changed without changing the physical size of the MNG resonator 1210.

In a near field, the electric field is concentrated in the capacitor 1250 inserted into the first transmission line, causing the magnetic field to become dominant in the near field. The MNG resonator 1210 has a relatively high Q-factor when the capacitor 1250 is a lumped element, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 12B, a magnetic core passing through the MNG resonator 1210 may be provided to increase a power transmission distance.

Referring to FIG. 12B, the feeding unit 1220 includes a second transmission line (not identified by a reference numeral in FIG. 12B, but formed by various elements in FIG. 12B as discussed below), a third conductor 1271, a fourth conductor 1272, a fifth conductor 1281, and a sixth conductor 1282.

The second transmission line includes a third signal conducting portion 1261 and a fourth signal conducting portion 1262 in an upper portion of the second transmission line, and includes a second ground conducting portion 1263 in a lower portion of the second transmission line. The third signal conducting portion 1261 and the fourth signal conducting portion 1262 are disposed to face the second ground conducting portion 1263. A current flows through the third signal conducting portion 1261 and the fourth signal conducting portion 1262.

One end of the third signal conducting portion 1261 is connected to one end of the third conductor 1271, the other end of the third signal conducting portion 1261 is connected to one end of the fifth conductor 1281, and the other end of the third conductor 1271 is connected to one end of the second ground conducting portion 1263. One end of the fourth signal conducting portion 1262 is connected to one end of the fourth conductor 1272, the other end of the fourth signal conducting portion 1262 is connected to one end the sixth conductor 1282, and the other end of the fourth conductor 1272 is connected to the other end of the second ground conducting portion 1263. The other end of the fifth conductor 1281 is connected to the first signal conducting portion 1231 at or near where the first signal conducting portion 1231 is connected to one end of the capacitor 1250, and the other end of the sixth conductor 1282 is connected to the second signal conducting portion 1232 at or near where the second signal conducting portion 1232 is connected to the other end of the capacitor 1250. Thus, the fifth conductor 1281 and the sixth conductor 1282 are connected in parallel to both ends of the capacitor 1250. The fifth conductor 1281 and the sixth conductor 1282 are used as an input port to receive an RF signal as an input.

Accordingly, the third signal conducting portion 1261, the fourth signal conducting portion 1262, the second ground conducting portion 1263, the third conductor 1271, the fourth conductor 1272, the fifth conductor 1281, the sixth conductor 1282, and the resonator 1210 are connected to each other, causing the resonator 1210 and the feeding unit 1220 to have an electrically closed loop structure. The term “loop structure” includes a polygonal structure, a circular structure, a rectangular structure, and any other geometrical structure that is closed, i.e., that does not have any opening in its perimeter. The expression “having a loop structure” indicates a structure that is electrically closed.

If an RF signal is input to the fifth conductor 1281 or the sixth conductor 1282, input current flows through the feeding unit 1220 and the resonator 1210, generating a magnetic field that induces a current in the resonator 1210. A direction of the input current flowing through the feeding unit 1220 is identical to a direction of the induced current flowing through the resonator 1210, thereby causing a strength of a total magnetic field to increase in the center of the resonator 1210, and decrease near the outer periphery of the resonator 1210.

An input impedance is determined by an area of a region between the resonator 1210 and the feeding unit 1220. Accordingly, a separate matching network used to match the input impedance to an output impedance of a power amplifier may not be necessary. However, if a matching network is used, the input impedance may be adjusted by adjusting a size of the feeding unit 1220, and accordingly a structure of the matching network may be simplified. The simplified structure of the matching network may reduce a matching loss of the matching network.

The second transmission line, the third conductor 1271, the fourth conductor 1272, the fifth conductor 1281, and the sixth conductor 1282 of the feeding unit may have a structure identical to the structure of the resonator 1210. For example, if the resonator 1210 has a loop structure, the feeding unit 1220 may also have a loop structure. As another example, if the resonator 1210 has a circular structure, the feeding unit 1220 may also have a circular structure.

Figure 13A:
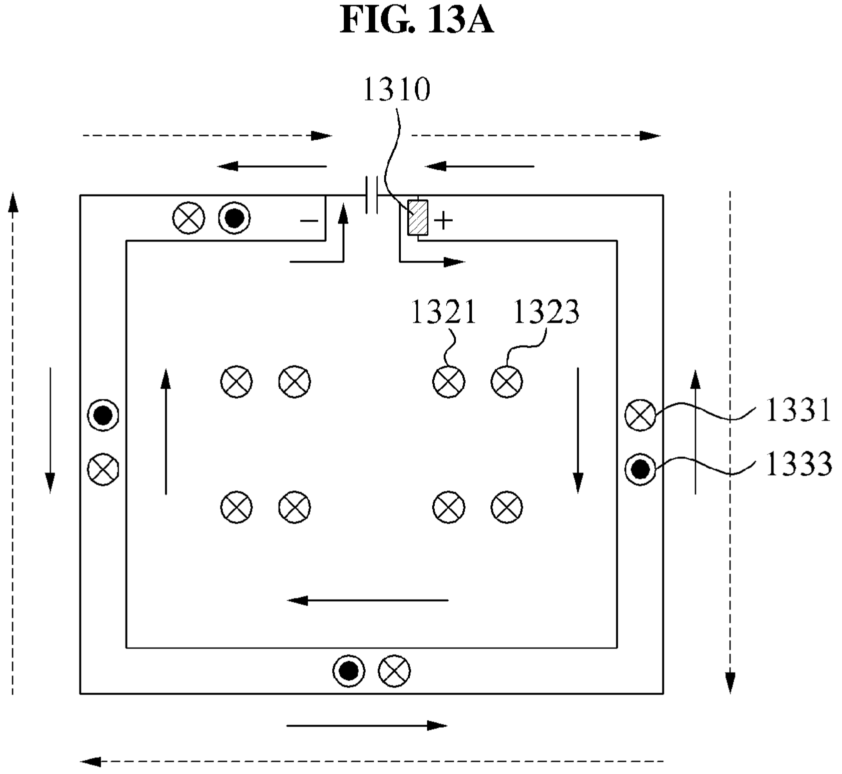
FIG. 13A is a diagram illustrating an example of a distribution of a magnetic field in a resonator that is produced by feeding of a feeding unit, of a wireless power transmitter.

FIG. 13A is a diagram illustrating an example of a distribution of a magnetic field in a resonator that is produced by feeding of a feeding unit, of a wireless power transmitter. FIG. 13A more simply illustrates the resonator 1210 and the feeding unit 1220 of FIGS. 12A and 12B, and the names of the various elements in FIG. 12B will be used in the following description of FIG. 13A without reference numerals.

A feeding operation may be an operation of supplying power to a source resonator in wireless power transmission, or an operation of supplying AC power to a rectification unit in wireless power transmission. FIG. 13A illustrates a direction of input current flowing in the feeding unit, and a direction of induced current flowing in the source resonator. Additionally, FIG. 13A illustrates a direction of a magnetic field formed by the input current of the feeding unit, and a direction of a magnetic field formed by the induced current of the source resonator.

Referring to FIG. 13A, the fifth conductor or the sixth conductor of the feeding unit 1220 may be used as an input port 1310. In FIG. 13A, the sixth conductor of the feeding unit is being used as the input port 1310. An RF signal is input to the input port 1310. The RF signal may be output from a power amplifier. The power amplifier may increase and decrease an amplitude of the RF signal based on a power requirement of a target device. The RF signal input to the input port 1310 is represented in FIG. 13A as an input current flowing in the feeding unit. The input current flows in a clockwise direction in the feeding unit along the second transmission line of the feeding unit. The fifth conductor and the sixth conductor of the feeding unit are electrically connected to the resonator. More specifically, the fifth conductor of the feeding unit is connected to the first signal conducting portion of the resonator, and the sixth conductor of the feeding unit is connected to the second signal conducting portion of the resonator. Accordingly, the input current flows in both the resonator and the feeding unit. The input current flows in a counterclockwise direction in the resonator along the first transmission line of the resonator. The input current flowing in the resonator generates a magnetic field, and the magnetic field induces a current in the resonator due to the magnetic field. The induced current flows in a clockwise direction in the resonator along the first transmission line of the resonator. The induced current in the resonator transfers energy to the capacitor of the resonator, and also generates a magnetic field. In FIG. 13A, the input current flowing in the feeding unit and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 13A, within the feeding unit, a direction 1321 of the magnetic field generated by the input current flowing in the feeding unit is identical to a direction 1323 of the magnetic field generated by the induced current flowing in the resonator. Accordingly, a strength of the total magnetic field may increases inside the feeding unit.

In contrast, as illustrated in FIG. 13A, in a region between the feeding unit and the resonator, a direction 1333 of the magnetic field generated by the input current flowing in the feeding unit is opposite to a direction 1331 of the magnetic field generated by the induced current flowing in the source resonator. Accordingly, the strength of the total magnetic field decreases in the region between the feeding unit and the resonator.

Typically, in a resonator having a loop structure, a strength of a magnetic field decreases in the center of the resonator, and increases near an outer periphery of the resonator. However, referring to FIG. 13A, since the feeding unit is electrically connected to both ends of the capacitor of the resonator, the direction of the induced current in the resonator is identical to the direction of the input current in the feeding unit. Since the direction of the induced current in the resonator is identical to the direction of the input current in the feeding unit, the strength of the total magnetic field increases inside the feeding unit, and decreases outside the feeding unit. As a result, due to the feeding unit, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 13B:
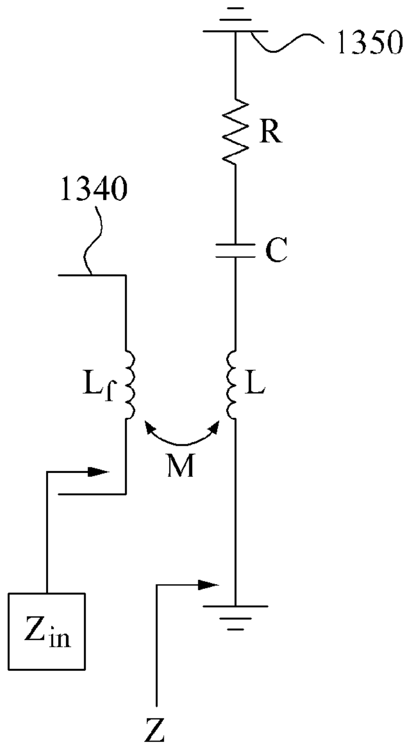
FIG. 13B is a diagram illustrating examples of equivalent circuits of a feeding unit and a resonator of a wireless power transmitter.

FIG. 13B is a diagram illustrating examples of equivalent circuits of a feeding unit and a resonator of a wireless power transmitter. Referring to FIG. 13B, a feeding unit 1340 and a resonator 1350 may be represented by the equivalent circuits in FIG. 13B. The feeding unit 1340 is represented as an inductor having an inductance $L_f$, and the resonator 1350 is represented as a series connection of an inductor having an inductance L coupled to the inductance $L_f$ of the feeding unit 1340 by a mutual inductance M, a capacitor having a capacitance C, and a resistor having a resistance R. An example of an input impedance $Z_{in}$ viewed in a direction from the feeding unit 1340 to the resonator 1350 may be expressed by the following Equation 4:

$$Z_{in} = \frac{(\omega M)^2}{Z} \tag{4}$$

In Equation 4, M denotes a mutual inductance between the feeding unit 1340 and the resonator 1350, ω denotes a resonance frequency of the feeding unit 1340 and the resonator 1350, and Z denotes an impedance viewed in a direction from the resonator 1350 to a target device. As can be seen from Equation 4, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeding unit 1340 and the resonator 1350. The area of the region between the feeding unit 1340 and the resonator 1350 may be adjusted by adjusting a size of the feeding unit 1340, thereby adjusting the mutual inductance M and the input impedance $Z_{in}$. Since the input impedance $Z_{in}$ may be adjusted by adjusting the size of the feeding unit 1340, it may be unnecessary to use a separate matching network to perform impedance matching with an output impedance of a power amplifier.

In a target resonator and a feeding unit included in a wireless power receiver, a magnetic field may be distributed as illustrated in FIG. 13A. For example, the target resonator may receive wireless power from a source resonator via magnetic coupling. The received wireless power induces a current in the target resonator. The induced current in the target resonator generates a magnetic field, which induces a current in the feeding unit. If the target resonator is connected to the feeding unit as illustrated in FIG. 13A, a direction of the induced current flowing in the target resonator will be identical to a direction of the induced current flowing in the feeding unit. Accordingly, for the reasons discussed above in connection with FIG. 13A, a strength of the total magnetic field will increase inside the feeding unit, and will decrease in a region between the feeding unit and the target resonator.

According to the teachings above, there is provided a sound system using wireless power transmission to wirelessly transmit power and sound data, which increases a degree of freedom in adjusting a location and a direction of a speaker. The speaker includes a battery with a predetermined capacity. Accordingly, a source device may wirelessly supply a predetermined amount of power, irrespective of a change in an output of the speaker.

Additionally, the speaker may operate as a relay device, i.e., as a target device configured to wirelessly receive power, and a source device configured to wirelessly transfer the received power to another speaker. Further, the source device may wirelessly transmit the power and the sound data simultaneously using a single resonator.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments accomplishing the examples disclosed herein can be easily construed by programmers skilled in the art to which the examples pertain based on and using the flow diagrams and block diagrams of the figures and their corresponding descriptions as provided herein.

As a non-exhaustive illustration only, a terminal and a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A power and data transmission apparatus in a sound system using wireless power transmission, the apparatus comprising:

a data transmitting unit configured to wirelessly transmit sound data, to sound output devices;

a power transmitting unit configured to wirelessly transmit power, to the sound output devices; and a controller configured to control the data transmitting unit and the power transmitting unit, based on a distance between the apparatus and the sound output devices, wherein the controller is configured to control the power transmitting unit to transmit the power to a relay device positioned within a predetermined distance, in response to the distance between the apparatus and the sound output devices being greater than the predetermined distance, and determine a multichannel sound data corresponding to each of the sound output devices.

2. The apparatus of claim 1, wherein the sound data is stored in a storage space, or is received from a broadcasting station in real-time, or any combination thereof.

3. The apparatus of claim 1, further comprising:

a source resonator;

wherein a sound output device comprises a target resonator;

wherein the source resonator and the target resonator are configured to perform magnetic coupling with each other to wirelessly transmit and receive, respectively, the sound data and the power; and wherein the controller is further configured to control the data transmitting unit and the power transmitting unit, based on a distance between the source resonator and the target resonator.

4. The apparatus of claim 3, wherein the controller is further configured to control the data transmitting unit to:

wirelessly transmit the sound data via in-band communication, to the sound output device, if the distance between the source resonator and the target resonator is less than or equal to a predetermined value; and wirelessly transmit the sound data via out-band communication, to the sound output device, if the distance between the source resonator and the target resonator is greater than the predetermined value.

5. The apparatus of claim 3, wherein the controller is further configured to control the power transmitting unit to:

transmit the power, to a relay device positioned within a distance less than or equal to a predetermined value, if the distance between the source resonator and the target resonator is greater than the predetermined value.

6. The apparatus of claim 5, wherein the relay device is configured to:

receive the power, from the power transmitting unit; and transfer the power, to the sound output device.

7. The apparatus of claim 3, further comprising:

a sensing unit configured to measure the distance between the source resonator and the target resonator.

8. The apparatus of claim 3, wherein the controller is further configured to:

control the data transmitting unit and the power transmitting unit to wirelessly transmit the sound data and the power, respectively and simultaneously, to the sound output devices, if the distance between the source resonator and the target resonator is less than or equal to a predetermined value; and control the data transmitting unit to wirelessly transmit the sound data, to the sound output devices, if the distance between the source resonator and the target resonator is greater than the predetermined value.

9. The apparatus of claim 1, wherein the sound output devices comprise speakers.

10. The apparatus of claim 1, wherein:

the sound output devices comprise a hexahedral speaker; and each face of the hexahedral speaker comprises a resonator configured to perform magnetic coupling to wirelessly receive the sound data and the power.

11. The apparatus of claim 1, wherein the sound output devices comprise:

a power storage device configured to maintain a constant input impedance of the sound output devices.

12. A power and data reception apparatus in a sound system using wireless power transmission, the apparatus comprising:

a data receiving unit configured to wirelessly receive sound data, from a power and data transmission apparatus;

a power receiving unit configured to wirelessly receive power, from the power and data transmission apparatus;

a sound output unit configured to output the sound data; and a relay unit configured to transfer the power, to sound output devices, in correspondence to the power and data reception apparatus being positioned within a predetermined distance, and a distance between the power and data transmission apparatus and the sound output devices being greater than the predetermined distances;

wherein the sound data comprises multichannel sound data corresponding to each of the sound output devices.

13. The apparatus of claim 12, further comprising:

a target resonator, wherein the power and data transmission apparatus comprises a source resonator, the source resonator and the target resonator being configured to perform magnetic coupling with each other to wirelessly transmit and receive, respectively, the sound data and the power.

14. The apparatus of claim 12, wherein:

the data receiving unit is further configured to receive data about the sound output device; and the relay unit is further configured to transfer the power, to the sound output device, based on the data about the sound output device.

15. The apparatus of claim 12, further comprising:

a controller configured to determine an output level of the sound output unit, wherein the sound output unit is further configured to amplify the sound data, based on the output level, and output the amplified sound data.

16. The apparatus of claim 15, further comprising:
a power storage unit disposed between the power receiving unit and the sound output unit, and configured to store a predetermined amount of power, and transfer the stored power, to the sound output unit, based on the output level.

17. A sound system using wireless power transmission, the sound system comprising:
a source resonator;
a data transmitting unit configured to wirelessly transmit sound data via the source resonator;
a power transmitting unit configured to wirelessly transmit power via the source resonator;
speakers configured to wirelessly receive the sound data and the power, and output the sound data; and
a controller configured to determine multichannel sound data corresponding to each of the speakers comprising respective target resonators;
wherein the source resonator and the target resonators are configured to perform magnetic coupling with each other to wirelessly transmit and receive, respectively, the sound data and the power.

18. The sound system of claim 17, wherein the multichannel sound data is generated based on a number of the speakers.

19. The sound system of claim 17, wherein the controller is further configured to:
classify the speakers into nearby speakers and remote speakers, based on the distance between the source resonator and each of the respective target resonators.

20. The sound system of claim 19, further comprising:
a charging wall disposed at a predetermined distance from the remote speakers, and configured to transmit power, to the remote speakers.

21. The sound system of claim 17, further comprising:
a controller configured to determine an output level of the speakers,
wherein each of the speakers comprises
an amplifier configured to amplify the sound data, and
a power storage unit configured to store a predetermined amount of power, and transfer the stored power, to the amplifier, based on the output level.

* * * * *